3,507,951
**COLORED POLYCARBONATES AND PROCESS
FOR PREPARING THE SAME**
Andrew S. Morecroft, Bridgeville, and John V. Bailey, New Martinsville, W. Va., assignors to Mobay Chemical Company, Pittsburgh, Pa., a corporation of Delaware
Filed July 19, 1966, Ser. No. 566,354
Int. Cl. B29b 1/04
U.S. Cl. 264—349      7 Claims The present invention relates to polycarbonates, particularly to a method for dispersing pigments in a polycarbonate composition and more particularly to a colored polycarbonate composition which exhibits excellent color stability at high temperatures.

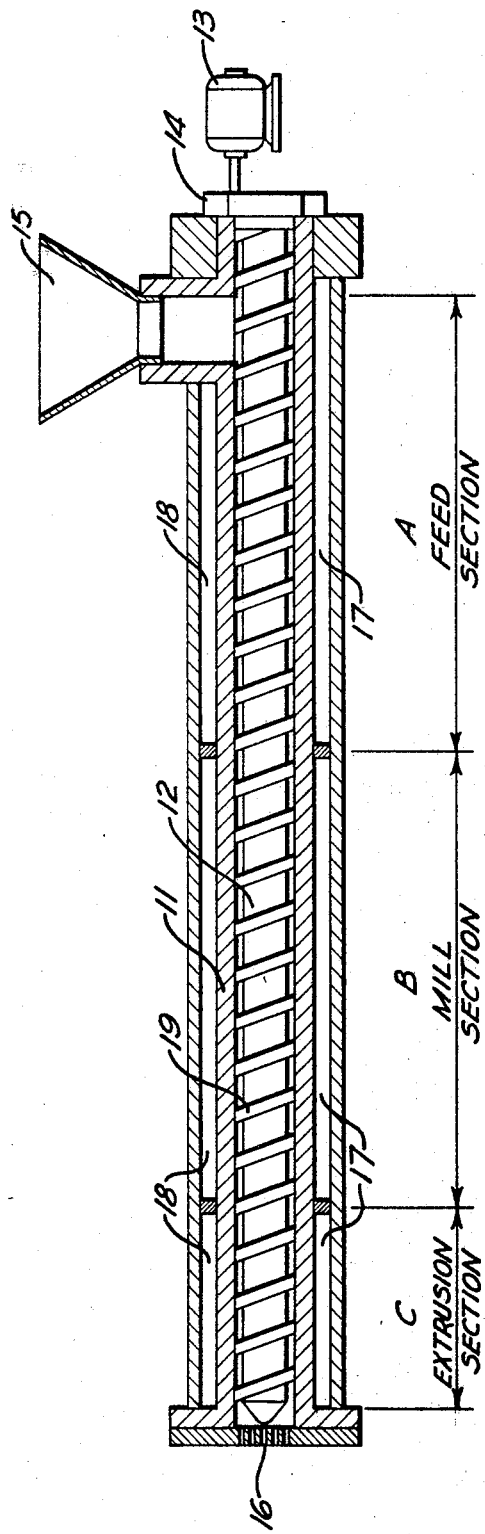
INVENTORS.
ANDREW S. MORECROFT
JOHN V. BAILEY
BY
ATTORNEYS.

Dyes and pigments have been incorporated in thermoplastic resins to impart color to the fabricated parts. However, there are two general areas of problems associated with the coloring of polycarbonate resins. First of all, due to the high melt viscosity of the polycarbonates, it is extremely difficult to uniformly disperse the pigment therein and secondly, the high temperature necessary for molding the resin permits the use of only those pigments which are stable under these conditions. Another problem associated with coloring polycarbonates is the fact that the amount of pigment used should be as little as possible in order to avoid any detrimental effect on the properties of the polycarbonates. In the case of dyes, a very small amount is adequate for coloring, however, as mentioned heretofore, the principal problem is obtaining dyes sufficiently stable to polycarbonate processing temperatures.

There are two factors which are essential in order to make an acceptable color; the first factor is obtaining good dispersion of the pigment and the second is dilution or distribution of the dispersed pigment in the polymer. Dispersion is defined simply as the breaking up of agglomerates of individual pigment particles which are held together by surface and/or electrostatic forces. The breaking up of these agglomerates is accomplished by shearing action which must exceed the forces which are causing the agglomeration. After sufficient shear has been applied to break the agglomerates, the individual pigment particles must be wetted immediately in order to prevent reagglomeration of the pigment particles. In the dilution step, the polycarbonate melt must be sufficiently mixed in order to obtain suitable distribution of the pigment throughout the polycarbonate melt, and thus provide uniform pigmentation. Good dispersion of pigment particles is essential in order to prevent pitting and streaking on the surfaces of extruded and molded articles. Furthermore, good dispersions and distribution of pigments are essential in order to obtain consistent color development and uniform pigmentation from batch to batch.

It was known that dry blending of colorants on pellets and subsequent extrusion at relatively high rates and high extrusion temperatures resulted in poor color dispersion in extruded articles. In order to improve the color dispersion, several dispersing agents, such as polyethylene glycols were added. However, even though the dispersion was somewhat improved, articles molded from these colored polycarbonates still exhibited pitting and streaking on their surfaces. In addition, the polyethylene glycols impaired the physical properties of the polycarbonates.

It is therefore an object of this invention to provide colored polycarbonate resins. Another object of this invention is to provide colored polycarbonate resins having a pigment uniformly dispersed therein. Another object of this invention is to provide colored polycarbonate resins having a pigment uniformly dispersed therein. Another object of this invention is to provide colored polycarbonate compositions which can be prepared in bulk. Still another object of this invention is to provide a process for preparing colored polycarbonate compositions. Still another object of this invention is to provide a process for preparing colored polycarbonate compositions by dry blending techniques. A further object of this invention is to provide a process for preparing colored polycarbonate compositions from pigments. A still further object of this invention is to provide a process for preparing colored polycarbonate compositions which are reproducible from batch to batch.

These and other objects are accomplished in accordance with this invention, generally speaking, by extruding an admixture of polycarbonate pellets and pigment through an extruder having a uniform flight depth and a decreasing temperature profile extending from the feed zone to the die end of about 100° C., or in other words from about 80° C. to about 120° C. subjecting said polycarbonate pellets to a low shear rate while subjecting said pigment to a high shear rate and thereby forming a pigmented polycarbonate composition having pigment uniformly dispersed therein.

FIGURE 1 is a cross-sectional view of an extruder device which is described in detail.

The novel features of this invention including the objects and advantages thereof will be better understood by reference to the following description taken in conjunction with the accompanying drawing. The accompanying illustrated drawing shows certain features of the extrusion device of this invention. In this apparatus an extrusion screw having the special characteristics described below cooperates with an extrusion barrel and an extruder feeding means in the manner shown in FIGURE 1.

In FIGURE 1 the entire device is divided into three sections indicated by letters A, B and C. The section designated as A is known as the feed section, section B is known as the mill section and section C is known as the extrustion section. The device consists essentially of a barrel 11 into which there is fitted a screw device 12 which is rotably driven by power torque 13 connected at 14. The polycarbonate pellets and pigment are continuously fed into section A through feed hopper 15. The pellets are advanced by rotation of screw 12 through sections A, B and C in that order. By the time the pellets have reached section B, a viscous plastic mass has formed having the pigment dispersed throughout. Section C is merely an ordinary extrusion device wherein a preferably smooth barrel surrounds the screw 12 and plastic material is forced through the section and out through a conventional die such as indicated at 16. Surrounding barrel 11 are several jackets 17 and 18 which provide for the introduction and withdrawal of temperature controlling medium such as hot water, steam, oil or other heat transfer medium. These jackets may be replaced with other temperature controlling mechanisms, such as, infra-red and electrical heaters along with cooling fans.

As shown in FIGURE 1, the screw device 12 has helical threads 19 which are of generally constant pitch between a minimum angle of 9° and a maximum angle of 18°. The root diameter of the screw 12 is uniform throughout its length. The extruder may have a length to diameter (L:D) ratio of from about 10:1 to 24:1 or more, preferably about 20:1 or more.

Another advantage of this extruder is its relatively low inventory of feed material and the ease with which the screw may be cleaned. When the color of the feed material must be changed frequently, the above features result in a reduced amount of off-color product due to color change-over.

By utilizing the process and apparatus of this invention, it is possible to obtain colored polycarbonates having a pigment uniformly distributed throughout. Moreover, with the novel method and apparatus of this invention, it is possible to obtain uniform pigmentation by first dry blending the polycarbonate pellets with a pigment and then extruding the resulting mixture through the modified extruding apparatus.

The operation of the extruder should be apparent from the above description. The polycarbonate pellets, and pigment are fed through the feed opening 15 where they are masticated, plasticized, pressurized and heated in the feed section as the polycarbonate pellets move through the feed section into the milling section and forward to the extrusion die.

The conventional extruders have a compression ratio of 2.5:1 to about 4:1 or higher which necessitates the input of a large amount of mechanical energy to move the material forward and through the die. As a result of this input of energy, a large temperature differential exists between the surface and the core of the pellets, which results in the formation of molten polycarbonate over a distance of as little as 1/20 of the length of the barrel. The molten polycarbonate thus formed on the pellet surface suspends the pigment agglomerate, thereby preventing the application of the necessary shear to break up the agglomerates into individual particles.

In contrast to the conventional extruders, the present extruder has a very low compression ratio, thus necessitating a very low input of mechanical energy and thereby maintaining a very small temperature differential between the surface and core of the pellet. As a result, the pellet melts in a substantially uniform manner over an initial length of from about 1/3 to about 2/3 of the length of the extruder. After the polycarbonate pellets have been converted to a molten condition, the final 2/3 or 1/3 of the extruder is used for mixing and distributing the pigment uniformly throughout the molten mass prior to extrusion through the die.

In the melting down phase of the process, it was generally considered necessary to exert a high shear on the polycarbonate pellets in order to obtain a uniform pigment dispersion. However, it has since been found that a more uniform pigment dispersion may be achieved by maintaining a relatively low temperature and consequently high viscosity in the polycarbonate melt and thereby exerting a high shear force on the pigment particles. In other words, a low shear on the polycarbonate pellets provides for a low thermal differential throughout the pellet, whereas a high shear on the pellet would provide for a high thermal differential and uneven heat distribution throughout. A high shear would result in the outer surfaces of the pellet being subjected to a higher temperature than the center of the pellets due to the combination of auxiliary heat from the extruder and the mechanical energy in shearing the pellet surface. Due to the temperature differential in the pellet, the outer surface would be converted to a high temperature, low viscosity fluid state, while the center of the pellet would remain in a relatively cool, substantially solid state. Consequently, it has been found that by subjecting the polycarbonate pellet to low shear, it is possible to maintain a uniform low melt temperature in the pellet and at the same time transform the pellet from a solid to a highly viscous molten state.

Generally, pigment particles are not independent of one another, but instead exert interparticulate forces which lead to particle agglomeration. However, where a low shear rate is exerted on the polycarbonate pellet to form a highly viscous molten polycarbonate mass, a high shear is in turn exerted on the pigment particle. Due to the high viscosity of the polycarbonate mass, sufficient shear is thus exerted on the agglomerated particles to break them down into individual particles whose surfaces are then wetted with molten polycarbonate material and thereby prevent their reagglomeration.

By this process, the coloring of polycarbonates is easily controlled. Problems due to variation in shade are eliminated, while uniform distribution of pigment throughout the polycarbonate mass is obtained. The coloring material used should preferably be one which under the conditions used in the extrusion process causes no appreciable degradation of the polycarbonate, that is to say, the intrinsic viscosity of the polycarbonate which has been melted in the extruding apparatus in the presence of the pigment should not be markedly different from that which has been melted in the extruding apparatus in the absence of the pigment. In addition, the coloring material used should preferably be one which under the conditions does not substantially affect the impact strength and other physical properties of the extruded polycarbonate.

Examples of suitable pigments are white opaque pigments such as lead, zinc, titanium, and antimony oxide pigments, red, maroon and brown inorganic pigments composed of the various oxides of iron; cadmium yellows, reds and maroons, such as cadmium sulfoselenides, cadmium sulfides; chrome yellows and oranges; green pigments such as chrome greens, chromium oxides and the hydrated chromium oxides; blue pigments such as the iron blues and ultramarine blues; carbon blacks, iron oxide blacks and the like. Examples of these pigments are: Pigment Blue 15 (C.I. 74160), Diluted Black–PDS 161B–192 (Kohnstamm), Solvent Violet 13 (C.I. 60725), Yellow 37 (C.I. 77199), Cadmium Red 108 (C.I. 77196), Croton Fast Green Toner 4D3600 (Harshaw Chemical Co.), Amaplast Yellow GHS (Drakenfeld), PDS 987 Thermax Blue-Black (Kohnstamm), Marine Blue (Drakenfeld), Scarlet Red 10177 (Drakenfeld), Scarlet Red 10051 (Drakenfeld), and the like.

Other pigments which may be employed are the phthalocyanine pigments such as, for example, copper phthalocyanine (Monastral Fast Blue B or Heliogen Blue BA), chlorinated copper phthalocyanine (Monastral Fast Green G or Heliogen Green GA), sulfonated copper phthalocyanine, metal free phthalocyanine (Monastral Fast Blue G) and phthalocyanine derivatives in which one or more of the external hydrogen atoms are replaced by other groups such as halogen, alkyl, aryl, amino, nitro, substituted amino, sulfo, carboxy, alkoxy, aryloxy, thiocyano and the like.

Although the instant invention is directed particularly to a process for dispersing pigments in polycarbonate materials, it is equally effective for coloring polycarbonate materials with organic dyes. As mentioned previously, organic dyes do not present the same problems as encountered in using pigments, since they are soluble in organic solvents. Examples of organic dyes which may be employed are triphenyl methane, oxazine, thiazine, nitromethine, azodyestuffs and anthraquinone dyestuffs.

Among the azo-dyestuffs there may be mentioned, for example, diazo-dyestuffs and especially monoazo-dyestuffs, for example, those of the benzene-azo-benzene, benzene - azo - pyrozolone, benzene-azo-acetoacetic acid arylide or benzene-azo-naphthalene series. The monoazodyestuffs may contain further substituents of the kind customary in azo dyestuffs and which do not react with polycarbonates.

Examples of suitable azo-dyestuffs are: Amido Naphthol Red 6B (C.I. 57), Amido Naphthol Red G (C.I. 31), Brillant Croceine M (C.I. 252), Metanil Yellow (C.I. 138), Acid Black 10B (C.I. 246), Orange II (C.I. 151), Orange G (C.I. 27), Polar Red (C.I. 430), Ponceau R (C.I. 79), Resorcin Brown (C.I. 234), Chrome Yellow 2G (C.I. 36), Azo Rubine (C.I. 179), Chrome Black T (C.I. 203), Chrome Blue Black B (C.I. 201), Chrome Blue Black R (C.I. 202), Chrome Red B (C.I. 652), Sudan I (C.I. 24), Monolite Red B (C.I. 44), Naphthylamine Bordeaux (C.I. 82), Metanitroaniline Orange (C.I. 38), Pigment Fast Red HL (C.I. 69), Tartrazine (C.I. 640), Permanent Orange R (C.I. 156), Lake Red C (C.I. 165), Lithol Red R (C.I. 189), Direct Green B (C.I. 593), Direct Brown (C.I. 420), Naphthogene Blue 4R (C.I. 534), Diamine Sky Blue FF (C.I. 518), Benzo Fast Yellow 5GL (C.I. 346), Chrysophenine (C.I. 365), Toluylene Orange R (C.I. 446), Diamine Rose BD (C.I. 128), Benzo Fast Red 8BL (C.I. 278), Benzo Fast Scarlet 4BA (C.I. 327), Diamine Fast Red F (C.I. 419) and the like.

Other dyes which are especially suitable for use in the process are the anthraquinone series, for example, Alizarin II (C.I. 1027), Naphthazarin (I) (C.I. 1019), Alizarine Orange A (C.I. 1033), Alizarine Brown R (C.I. 1035), Alizarine Purpurin (C.I. 1037), Quinalizarin (C.I. 1045), Anthracene Blue WR (C.I. 1062), Alizarine Blue S (C.I. 1066), Alizarine Red S (C.I. 1034), Alizarine Blue SAP (C.I. 1054), Alizarine Blue SAE (C.I. 1053), Alizarine Blue-Black B (C.I. 1085), Cyananthrol R (C.I. 1076), Alizarine Rubinol R (C.I. 1901), Cibanone Blue 3G (C.I. 1173), Pyrazoleanthrone Yellow (C.I. 1122) and the like.

The dyestuffs may be used in conjunction with pigments, especially white pigments for example, titanium dioxide. Instead of using a single dyestuff, a mixture of dyestuffs and pigments may be used.

In blending pigments with polycarbonate pellets, it was the general opinion that the greater the number of blending revolutions, the better the pigment dispersion in the extruded product. However, it was found that as the blending revolutions increased, the degree of brightness of the colored polycarbonate decreased. In other words, the brightness values of a colored polycarbonate composition are influenced by the number of blending revolutions beyond those required in order to obtain a pigment coating on the surface of the polycarbonate pellets. In order to form a polycarbonate composition having a high degree of brightness, it was found that the number of blending revolutions are critical. Instead of blending the pigment and polycarbonate composition in the conventional manner, such as from about 520 or more revolutions, it was found desirable to blend the composition only until the polycarbonate pellets are coated with the pigment, generally from about 20 to about 280 revolutions, depending on the pigment formulation. Furthermore, it was found that the color brightness is an inverse function of the blender revolutions, that is, the greater the number of revolutions beyond the required minimum, the duller the coloration of the extruded polycarbonate. By revolution, we mean the motion of a body round a center or axis, such that any line of the body remains throughout parallel to its initial position, to which it returns on completing the circuit.

Any suitable device may be used for blending pigments with polycarbonate pellets, including the conventional blenders and mixers such as ribbon mixers, tumbling barrel mixers, double cone mixers, V-cone mixers and the mushroom mixers.

The amount of pigment employed is not critical, however, a sufficient amount should be used to impart the desired degree of coloration. An excess amount of pigment should be avoided, as this will affect the physical properties of the colored polycarbonate. Generally for the average pigment about 0.1 percent to about 5 percent, preferably from about 0.5 to about 1.0 percent by weight based on the weight of the polycarbonate will provide the desired coloration. However, more or less pigment may be employed in special cases to provide the desired coloration without materially affecting the properties of the polycarbonate. For example, about 1 part of pigment may be introduced simultaneously with about 500 parts of polycarbonate pellets into an extruder or the pigment and polycarbonate pellets may first be blended to insure even distribution of the pigment on the surface of the pellets and thereafter extruded through the extrusion apparatus.

In another embodiment of this invention, a master batch technique may be followed, wherein a small quantity of polycarbonate pellets are introduced simultaneously with a large quantity of pigment to produce extruded pellets containing a high concentration of pigment. For example, from about 3 percent to 20 percent by weight of pigment or other suitable quantity to give the desired degree of coloration based on the weight of the polycarbonate may be added concurrently with polycarbonate pellets to an extruder to form highly concentrated colored pellets. These colored pellets may then be combined with transparent polycarbonate pellets in an extruder in a predetermined ratio to provide colored pellets of the desired coloration.

The temperature of the extruder may vary from about 350° C. to about 160° C., with the temperature profile decreasing from the feed zone (A) to the die end (C). The temperature of the feed zone should not exceed about 350° C., preferably from about 260° C. to about 300° C. and the temperature of the die end should be above about 160° C. and below about 200° C., preferably about 180° C.

The pressure on the die end of the extruder appears to have very little effect upon the degree of dispersion. The pressure may vary from about 500 p.s.i.g. up to about 10,000 p.s.i.g. preferably from about 500 to about 7000 p.s.i.g. without appreciably affecting the degree of dispersion. However, at pressures above about 10,000 p.s.i.g. the degree of dispersion is substantially reduced. In addition, the revolutions of the screw appear to have very little effect on the degree of dispersion, particularly when operating under the preferred barrel temperature conditions, wherein a temperature profile ranging from about 280° C. at the feed zone down to about 175° C. at the die end under a pressure ranging from about 3000 to 6000 p.s.i.g. measured at the die end of the extruder, are employed. However, it was found that when operating at pressures of from about 3000 to about 6000 p.s.i.g. it was necessary to minimize surging in the extruder in order to produce pellets of uniform size.

The degree of dispersion is determined by placing a colored pellet of polycarbonate on a slide which is heated to a temperature sufficient to melt the pellet. Pressure is then applied to form a thin film. This slide is then observed under a microscope, using both transmitted and reflected light at a magnification of 75X. By this method, the number of pigment agglomerates present and their relative size can be determined. In rating the degree of dispersion, pigment particles of from about .05 to about 25 microns in size, preferably below about 10 microns in size are rated as good dispersions.

The color is identified by chromaticity data on a brightness or lightness scale ranging from black to white.

The temperature at which the polycarbonate-pigment is extruded may vary from the softening point of the polycarbonate, e.g. on the order of from about 125° C. up to about 350° C. or higher. However, as mentioned heretofore, the temperature along the length of the extruder should decrease from the feed zone to the die end by about 100° C. In addition, the temperature should be sufficient to maintain the polycarbonate-pigment composition in a liquid (including molten) state.

Polycarbonates such as polycarbonate homopolymers, copolymers and copolyesters which are well known in the art may be employed in the practice of this invention. Some such suitable polycarbonates and processes for the preparation thereof are set forth, for example, in U.S. Patents 2,964,794; 3,028,365; 3,153,008; 3,187,065; 2,970,131; 3,284,414; 2,991,273; 2,999,835; 3,187,065; 3,320,211; 3,271,368; 3,271,367; 3,062,781; 2,999,846; 3,277,055; 3,261,808; 3,094,508 and so on.

Separation of the polymer from solution may be accomplished by a number of ways, such as by the addition of an aliphatic hydrocarbon non-solvent to cause precipitation of the thus formed polycarbonate. Examples of these non-solvents are pentane, hexane, heptane and mixed petroleum spirits with boiling points sufficiently low to enable easy separation by distillation or aliphatic alcohols such as methanol, ethanol, isopropanol or n-propanol. Also the polycarbonate may be recovered from a solution as a solid composition and if desired as small particles by controllably volatilizing the solvent from the solution under suitable pressure and temperature conditions until substantially all the solvent is removed, and thereafter extruding the remaining polycarbonate in molten form. In the course of transforming the polycarbonate from its initial state as solute in an organic solution to an essentially solvent-free molten state, the polycarbonate composition undergoing such transformation is maintained in a thermo state e.g. temperature and pressure to avoid solidification or gelling into an unmanageable mass. It is preferred that the polycarbonate be extruded into pellets which may then be blended with a pigment and thereafter re-extruded to form a colored polycarbonate. The colored polycarbonate material then may be worked up according to the usual processes, for example, by molding or injection molding or extruding to form shaped articles.

The colored composition can also include fillers, stabilizers, plasticizers and antioxidants and the like without departing from the scope of the present invention. Various shades and tints can also be obtained by employing mixtures of 2 or more pigments included within the scope of the invention. Similarly, mixtures of two or more different polycarbonate resins can be employed if desired.

The invention is further illustrated but not limited by the following examples in which parts and percentages are by weight unless otherwise specified.

EXAMPLE 1

Approximately 60 parts of 2,2-(4,4'-dihydroxydiphenyl)-propane are suspended in a solution containing about 21.2 parts of sodium hydroxide, about 1.02 parts of tert.-butyl phenol and about 250 parts of water. About 6 parts of phosgene are introduced into the solution at a temperature of about 30° C. with stirring and cooling. The mixture is then simultaneously treated with about 32 parts of phosgene and about 22 parts of sodium hydroxide in approximately 62 parts of water over a period of about 1 hour. The mixture is then stirred at about 80° C. for an additional hour and the colorless product thus obtained is filtered with suction and washed free of electrolytes. The product is dissolved in methylene chloride and then extruded in a devolatilizing extruder to form polycarbonate pellets.

EXAMPLE 2

Approximately 46 parts of 2,2-(4,4'-dihydroxy-3,3'-dimethyl-diphenyl)-propane and about 0.72 part of tert.-butyl phenol are added to about 64 parts of pyridine. About 257 parts of a 12% solution of phosgene in chloroform are added dropwise to the solution with stirring and cooling at 0° C. over a period of about 40 minutes. After approximately two-thirds of the phosgene solution has been added, the reaction mixture is further diluted with about 180 parts of methylene chloride. The viscous solution thus obtained is again soluted with approximately 150 parts of methylene chloride and shaken out with water and dried. After a portion of the solvent is evaporated, the solvent-lean polycarbonate solution is extruded in a devolatilizing extruder, to form polycarbonate strands which are then cut into pellets.

EXAMPLE 3

About 28 parts of 11-(4,4'-dihydroxydiphenyl)-cyclohexane and about 0.4 part of tert.-butyl phenol are added to about 34 parts of pyridine. To this solution is added about 103 parts of a 12 percent solution of phosgene in chloroform dropwise at about 0° C. over a period of about 1 hour with agitation. After approximately two-thirds of the phosgene solution is added, the reaction mixture is diluted with about 112 parts of methylene chloride. The reaction mixture is further diluted with approximately the same volume of methylene chloride and worked up in accordance with the procedure described in Example 2.

EXAMPLE 4

To a mixture containing approximately 140 parts of 2,2-(4,4'-dihydroxydiphenyl)-propane, about 66 parts of caustic soda, about 614 parts of water and about 320 parts of methylene chloride, about 0.12 part of sodium dithionite and 2.4 parts of tert.-butyl phenol is introduced about 73 parts of phosgene with agitation at a temperature of about 25° C. over a period of about 1 hour. The mixture is agitated for an additional two hours at room temperature, after which time a highly viscous mixture is formed. The mixture is washed with water until free of electrolytes and then extruded in a devolatilizing extruder to form pellets.

EXAMPLE 5

A solution containing about 100 parts of polycarbonate prepared in accordance with Example 4 is concentrated to an amount of about 22 parts of polycarbonate per hour in about 5 atmospheres steam heated thin layer evaporator so that about a 48 percent solution results which is practically free of methylene chloride. This solution is then advanced in about 22 parts of polycarbonate per hour in a conveyor heated to about 140° C. into a single screw extruder which possesses two exhaust tubes. In the first exhaust tube the bulk of the solvent is distilled off at about atmospheric pressure, in the second exhaust tube residual solvent is removed under vacuum less than 1 mm. Hg pressure. The diameter D of the screw is about 48 millimeters and the total length of the extruder is about 30D. The speed of the screw is about 250 r.p.m. Barrel temperature of the extruder is about 270° C., while the orifice is maintained at a temperature of about 220° C. The extruded polycarbonate recovered from the orifice is then sliced into pellets which are blended with a pigment in a conventional blending apparatus in a ratio of about 1 part of pigment per 454 parts of pellets for about 3 minutes at 30 r.p.m. The pigment coated polycarbonate pellets are then re-introduced into an extruding apparatus as described in FIGURE 1. The extruding apparatus consists of a 1½ inch diameter single screw having a uniform flight depth throughout which is mounted at one end of an elongated heating chamber. The pigment coated polycarbonate pellets are introduced at the rate of about 50 lbs. per hour with the screw rotating in a direction to impel the pellets forward towards the other end of the chamber which contains an extrusion die. The barrel temperature of the extruder at the feed portion is maintained at a temperature of about 270° C. while the extrusion section or die-end is maintained at a temperature of about 170° C. At this temperature a colored polycarbonate is extruded through the die-end in spaghetti-like rods of about ⅛ inch in cross-sectional diameter. This extruded material is then chopped into granular particles approximately ⅛ inch in length.

EXAMPLE 6

Into a mixture containing about 180 parts of bisphenol A about 3.1 parts of tert.-butyl phenol, about 600 parts of water, about 1280 parts of methylene chloride, about 540 parts of chlorobenzene and about 206 parts of a 45 percent sodium hydroxide solution is introduced with agitation about 94 parts of phosgene at 25° C. over a period of about 2 hours. Thereafter about 0.6 part of triethylamine are added. After stirring for an additional hour, the aqueous phase of the reaction mixture is separated by centrifugation and the organic phase is washed free of electrolytes with water. Approximately 2000 parts of a 10 percent solution of a polycarbonate in a mixture of methylene chloride and chlorobenzene is obtained. The polycarbonate solution is then concentrated at the rate of about 15 parts of polycarbonate per hour in a thin layer evaporator with steam at about 5 atmospheres until a 48 percent solution is formed. This solution is then heated to a temperature of about 140° C. advanced to a twin screw extruding apparatus containing interjacent screws and having three gas outlet pipes. At the first gas outlet pipe, the bulk of the solvent is distilled off at about atmospheric pressure and in the second and third gas outlet pipes the solvent residues are removed under vacuum (less than 1 mm. Hg pressure). The diameter of the screws is 48 mm. and the length of the extruder is about 30D. The speed of the screw is about 250 r.p.m. The barrel temperature of the extruder is heated to about 325° C. while the die end is maintained at a temperature of about 270° C. At this temperature, the polycarbonate is extruded through the die in spaghetti-like rods of about ⅛ inch cross-sectional diameter and chopped into pellets. These pellets are then blended with titanium dioxide in the ratio of 1 part of titanium dioxide per 450 parts of polycarbonate pellets, at a rate of about 30 revolutions per minute (r.p.m.) for a total of 3 minutes in a blending apparatus. The coated pellets are then introduced into the extruder such as described in Example 5. Polycarbonate pellets having a white pigment dispersed throughout are recovered.

EXAMPLE 7

A coloring composition is prepared by mixing the following formulation in a blending apparatus:

Ingredients: Part
  Titanium Dioxide (Rutile) _____ 0.5573
  Heliogen Blue (C. I. 74160) _____ 0.1832
  Diluted Black (Kohnstamm) _____ 0.0209
  Solvent Violet 13 (C.I. 60725) _____ 0.0182

Approximately 0.8 part of the above formulation are blended for about 10 minutes at a blender speed of about 52 revolutions per minute with about 454 parts of polycarbonate pellets prepared in accordance with Example 4. At the end of the blending time, the coated polycarbonate pellets are introduced into a 1½ inch single screw extruder as described in Example 5 having a rear zone (drive end) temperature of about 260° C. and a front zone (die end) temperature of 160° C. The colored polycarbonate strands thus obtained are then cut into pellets and molded into colored discs. The discs showed a brightness value of 5.2 whereas the brightness value for a reference chip made from this formulation is 7.9. A reference disc is obtained by first blending polycarbonate powder with the desired pigment formulation under optimum conditions, extruding the blended composition into pellets and then molding the pellets into a disc. The brightness value of the reference disc is measured and the value thus obtained is used as a standard for that particular pigment formulation.

Several additional runs are made in which the temperature of the rear zone (drive end) and front zone (die end) are varied slightly. The polycarbonate pellets obtained are examined as to the degree of pigment dispersion. The results are shown in Table A.

TABLE A

| No. | Temperature, °C. Rear zone | Temperature, °C. Front zone | Degree dispersion |
|---|---|---|---|
| 1 | 340 | 260 | Poor. |
| 2 | 260 | 260 | Fair. |
| 3 | 204 | 260 | Poor. |
| 4 | 315 | 176 | Do. |
| 5 | 287 | 176 | Good. |

Several additional runs are made in which the total blending revolutions of the polycarbonate pellets and pigment are varied. The pigment coated polycarbonate pellets are then extruded through the extruder in accordance with Example 5 at a rear zone temperature of 287° C. and a front zone temperature of 176° C. and then molded into discs. The colored discs are measured on a color instrument to obtain brightness data. The results are shown in Table B.

TABLE B

| No. | Blending time (min.) | Blender speed (r.p.m.) | Total revolutions | Brightness |
|---|---|---|---|---|
| Reference disc | | | | 7.9 |
| 1 | 10 | 52 | 520 | 5.2 |
| 2 | 5 | 52 | 260 | 6.2 |
| 3 | 2 | 52 | 104 | 7.2 |
| 4 | 1 | 52 | 52 | 7.5 |

EXAMPLE 8

A coloring composition is prepared by mixing the following in a blending apparatus.

Ingredients: Parts
  Scarlet Red (10177)—Drakenfeld
    (C.I. 77196) _____ 2.250
  Scarlet Red (10051)—Drakenfeld _____ 0.750

Approximately 3.0 parts of the above formulation are tumbled with about 454 parts of polycarbonate pellets for different blending times at different blender speeds. The coated pellets are then introduced into a 1½ inch single screw extruder maintained at a temperature of about 260° C. throughout the barrel. The extruded polycarbonate strands are cut into pellets and analyzed for brightness. The results are shown in Table C.

TABLE C

| No. | Blending time (min.) | Blender speed (r.p.m.) | Total revolutions | Brightness |
|---|---|---|---|---|
| Reference disc | | | | 10.0 |
| 1 | 20 | 56 | 1,120 | 8.1 |
| 2 | 30 | 28 | 840 | 8.6 |
| 2 | 30 | 28 | 840 | 8.6 |
| 3 | 10 | 56 | 560 | 8.7 |
| 4 | 10 | 28 | 280 | 9.2 |
| 5 | 10 | 14 | 140 | 9.5 |
| 6 | 2.5 | 56 | 140 | 9.4 |
| 7 | 2.5 | 28 | 70 | 9.6 |
| 8 | 2.5 | 14 | 35 | 9.6 |

Tables B adn C clearly illustrate that the total blending revolutions affect the brightness values of pigmented pellets.

EXAMPLE 9

A coloring composition is prepared by mixing the following formulations in a blending apparatus.

Ingredients: Parts
  Croton Fast Green Toner 4D-3600 (Harshaw) _____ 0.20
  Titanium Dioxide (Rutile) _____ 1.50
  Amaplast Yellow GHS (Kopper) _____ 0.003

Approximately 1.73 parts of the above formulation are tumbled with about 454 parts of polycarbonate pellets for different blending times at different blender speeds. The pellets are then extruded in accordance with Example 8 and analyzed. The results are shown in Table D.

TABLE D

| No. | Blending time (min.) | Blender speed (r.p.m.) | Total revolutions | Brightness |
|---|---|---|---|---|
| Reference disc | | | | 26.1 |
| 1 | 10 | 56 | 560 | 23.1 |
| 2 | 10 | 28 | 280 | 23.5 |
| 3 | 10 | 14 | 140 | 23.9 |
| 4 | 2.0 | 56 | 112 | 24.9 |
| 5 | 2.0 | 28 | 56 | 25.3 |
| 6 | 2.0 | 14 | 28 | 25.9 |

EXAMPLE 10

A coloring composition is prepared by mixing the following formulation in a blending apparatus.

Ingredients: Parts
  Thermax Blue-Black PD987 (Kohnstamm) _ 0.240
  Marine Blue (Drakenfeld) _____ 2.106
  Titanium Dioxide (Rutile) _____ 7.215
  Cadminum Red 108 (C.I. 77196) _____ 0.120

Approximately 9.7 parts of the above formulation are tumbled with about 454 parts of polycarbonate pellets for about 5 minutes at a blender speed of 20 revolutions. The coated polycarbonate pellets are then introduced into a single screw 1½ inch extruder along with transparent polycarbonate pellets in a proportion of about 3.2 parts of the above pigment formulation per 454 parts of polycarbonate pellets. The temperature of the rear zone (drive end) of the extruder is maintained at about 287° C. and the forward zone (die end) is maintained at about 176° C. The colored polycarbonate strands thus formed are then cut into pellets and analyzed for the degree of dispersion and brightness. The pellets exhibited a high degree of dispersion and showed a brightness value comparable to the reference disc value for the pigment formulation.

EXAMPLE 11

Approximately 3.2 parts of the colorant formulation of Example 10 are introduced simultaneously with about 454 parts of polycarbonate pellets into an extruder. The temperature of the rear zone (drive end) is maintained at about 287° C. and the die end is maintained at about 176° C. The colored polycarbonate strands are cut into pellets. Analysis of the colored pellets showed a high degree of dispersion.

EXAMPLE 12

Approximately 4.54 parts of titanium dioxide are blended for about 10 minutes at a blender speed of about 54 revolutions per minute with about 454 parts of polycarbonate pellets prepared in accordance with Example 4. At the end of the blending time, the coated polycarbonate pellets are introduced into a 2½ inch single screw extruder having a uniform flight depth and having a drive end temperature of about 260° C. and a die end temperature of about 160° C. The extruded colored polycarbonate strands are cut into pellets, molded into discs and analyzed to determine the degree of dispersion. Analysis of the colored pellets showed a high degree of dispersion.

EXAMPLE 13

Approximately 4.54 parts of titanium dioxide is added simultaneously with about 454 parts of polycarbonate pellets prepared in accordance with Example 4 to a 2½ inch single screw extruder having a uniform flight depth throughout and having a drive end temperature of about 260° C. and a die end temperature of about 160° C. The extruded colored polycarbonate strands are cut into pellets, molded into discs and analyzed. The molded discs are free of pitting or streaking on their surfaces and exhibit the same degree of dispersion as the molded discs obtained in Example 12.

EXAMPLE 14

A coloring formulation having the following ingredients is blended for about 10 minutes.

| Ingredients: | Parts |
|---|---|
| Ultramarine Violet | 2.65 |
| Ultramarine Blue | .10 |

Approximately 2.75 parts of the above formulation is blended with about 22,700 parts of polycarbonate pellets prepared in accordance with the procedure of Example 1, for about 2 minutes in a drum tumbler. The coated polycarbonate pellets are divided into two groups and extruded in the following manner.

(A) Approximately 11,350 parts of the coated pellets prepared above are introduced into a single screw 1½ inch extruder having a uniform screw throughout its length and having a rear zone (drive end) temperature of about 271° C. and a front zone (die end) temperature of about 177° C. The extruded polycarbonate strands are cut into pellets, molded into discs and analyzed. All the discs are clear and free of undispersed pigment.

(B) Approximately 11,350 parts of the coated pellets prepared above are introduced into a single screw 1½ inch extruder and extruded under identical conditions, except that a screw having a tapered root screw is substituted for the non-tapered screw above. The molded discs are cloudy and contain undispersed pigment.

This example clearly illustrates that the screw configuration substantially effects the quality of pigment dispersion and the ultimate color of the polycarbonate material. Where a tapered screw was employed the product exhibited a yellow color which was apparently due to the poor and non-uniform dispersion of the blue pigments throughout the polycarbonate material.

Looking at the brightness data tabulated in these tables, it can readily be seen that the values thus obtained are low when compared to the values obtained for the reference discs, particularly for long blending times. Furthermore, it can be seen that the brightness values increase as the total number of blender revolutions decrease.

Although specific colorants, conditions and polycarbonate pellets have been specified in the above examples, the other components and conditions discussed in the disclosure give results similar to those indicated in the above examples.

Although the invention has been described in considerable detail in the foregoing discussion for the purpose of illustration, it is to be understood that variations can be made by those skilled in the art without departing from the spirit of the invention and scope of the claims.

What is claimed is:

1. A method for preparing polycarbonates having a pigment uniformly dispersed therein which comprises introducing substantially simultaneously a pigment composition and polycarbonate resin pellets into an extruder equipped with a screw having a substantially uniform flight depth, a feed zone having a temperature of between about 260° C. and about 350° C. and an extrusion zone temperature of between about 160° C. and about 250° C., said extruder having a temperature profile gradient of between about 80° C. and about 120° C. between the feed zone and the extrusion zone, passing the pigment and polycarbonate through the zones with a low mechanical energy input, thereby maintaining a relatively low temperature and consequently high viscosity in the polycarbonate and exerting a high shear force on the pigment.

2. The method of claim 1 wherein the pigment composition and polycarbonate resin are dry blended prior to their introduction into the extruder.

3. The method of claim 2 wherein the carbonate pellets are blended with a pigment composition for from about 20 to about 280 revolutions of a mixer and until the pellets are coated with the pigment composition.

4. The method of claim 1 wherein the polycarbonate having the pigment uniformly dispersed therein contains from about 0.005 to about 5.0 percent by weight of pigment based on the weight of the polycarbonate.

5. The process of claim 1 wherein the polycarbonate pellets are obtained from the reaction of 2,2-bis-(4,4'-dihydroxydiphenyl)propane and a carbonic acid derivative.

6. The process of claim 1 wherein the temperature of the feed zone is maintained at about 280° C. and the temperature of the extrusion zone is maintained at about 170° C.

7. The process of claim 1 wherein the polycarbonate resin is blended with a pigment in a ratio of about 500:3 and extruded into pellets and thereafter blending transparent polycarbonate resin with the pigmented pellets in such an amount that the total polycarbonate to pigment ratio is about 500:1.

(References on following page)

References Cited

UNITED STATES PATENTS

| | | | |
|---|---|---|---|
| 2,869,253 | 7/1959 | Mol | |
| 2,982,990 | 5/1961 | Zomlefer. | |
| 3,030,330 | 4/1962 | Cines et al. | 264—349 |
| 3,148,412 | 9/1964 | Spreeuwers | 264—349 |
| 3,152,098 | 10/1964 | Snedeker | 260—37 |
| 3,304,580 | 2/1967 | Fochler. | |
| 3,353,974 | 11/1967 | Trimble et al. | 264—349 |

OTHER REFERENCES

"Polycarbonates," Christopher et al., Reinhold, 1962, TP156P6c4, pp. 25, 87, 88, 89, 156, 157, 158.

McKelvey: "Polymer Processing," Wiley, 1962, pp. 326–339.

JULIUS FROME, Primary Examiner

A. H. KOECKERT, Assistant Examiner

U.S. Cl. X.R.

18—12; 260—37